United States Patent [19]
Nakada

[11] Patent Number: 5,682,808
[45] Date of Patent: Nov. 4, 1997

[54] PISTON WITH A DIAMETRIC REDUCTION OF A SKIRT PORTION GREATER ON THE THRUST SIDE, THAN THAT ON THE COUNTER-THRUST SIDE

[75] Inventor: Teruo Nakada, Yokohama, Japan

[73] Assignee: Isuzu Motors Limited, Tokyo, Japan

[21] Appl. No.: 677,318

[22] Filed: Jul. 2, 1996

[30] Foreign Application Priority Data

Jul. 7, 1995 [JP] Japan .................................. 7-194015

[51] Int. Cl.⁶ .................................................. F16J 1/04
[52] U.S. Cl. ........................ 92/233; 92/208; 123/193.6
[58] Field of Search ........................... 92/177, 208, 233; 123/193.6

[56] References Cited

U.S. PATENT DOCUMENTS

| | | | |
|---|---|---|---|
| 4,648,309 | 3/1987 | Schellmann | 92/233 |
| 4,716,817 | 1/1988 | Ripberger | 92/233 |
| 5,058,489 | 10/1991 | Iwaya | 92/233 |
| 5,107,807 | 4/1992 | Arai et al. | 92/233 |
| 5,172,626 | 12/1992 | Hart | 92/177 |

FOREIGN PATENT DOCUMENTS

| | | |
|---|---|---|
| 0420618 | 9/1990 | European Pat. Off. . |
| 63-32150 | 2/1988 | Japan . |
| 9007642 | 7/1990 | WIPO . |
| 9104429 | 4/1991 | WIPO . |
| 9205355 | 4/1992 | WIPO . |

*Primary Examiner*—Thomas E. Denion
*Attorney, Agent, or Firm*—Browdy and Neimark

[57] ABSTRACT

The piston of this invention is so profiled that the diametric reduction of the shoulder portion of the skirt is greater on the thrust side than on the counter-thrust side and that the difference in diametric reduction between the thrust side and the counter-thrust side is maximum at around a position corresponding to the center of the piston pin. In the compression stroke, the piston moves up pressed against the cylinder liner wall on the counter-thrust side but the inclination angle of the piston at this time is small. Near the top dead center, the piston is rapidly pivoted and strikes against the cylinder liner wall on the thrust side. The point on the piston hitting the cylinder liner wall is at around a position equal in height to the center of the piston pin. This reduces the impact force of the piston and therefore the slap.

5 Claims, 8 Drawing Sheets

(A) Intake stroke

(B) Compression stroke

(C) Expansion stroke (D) Exhaust stroke

FIG. 3

Simulated calculation of piston impact force

FIG. 4

Examination on piston of this invention

PISTON WITH A DIAMETRIC REDUCTION OF A SKIRT PORTION GREATER ON THE THRUST SIDE, THAN THAT ON THE COUNTER-THRUST SIDE

BACKGROUND OF THE INVENTION

1. Field of the Invention

The present invention relates to a piston applied to internal combustion engines.

2. Description of the Prior Art

Among noise generated by internal combustion engines during operation is a piston slap. The piston slap of the internal combustion engines is generated by a skirt of the piston striking a cylinder liner wall when the piston reciprocates in the cylinder. That is, although a clearance is formed between the piston and the cylinder liner wall to allow reciprocating motion of the piston in the cylinder, the piston rings are fitted in piston ring grooves formed in the piston to prevent a blowdown from a combustion chamber. As the piston is reciprocated in the cylinder, it strikes an area of cylinder wall located in a direction perpendicular to the piston pin axis, i.e., in a thrust direction and caused the piston slap.

To reduce the piston slap, a variety of pistons have been developed. For example, Japan Patent Laid-Open No. 32150/1988 discloses such a piston, in which the profile of the skirt of the piston is so designed as to reduce the slap.

Figure 5:
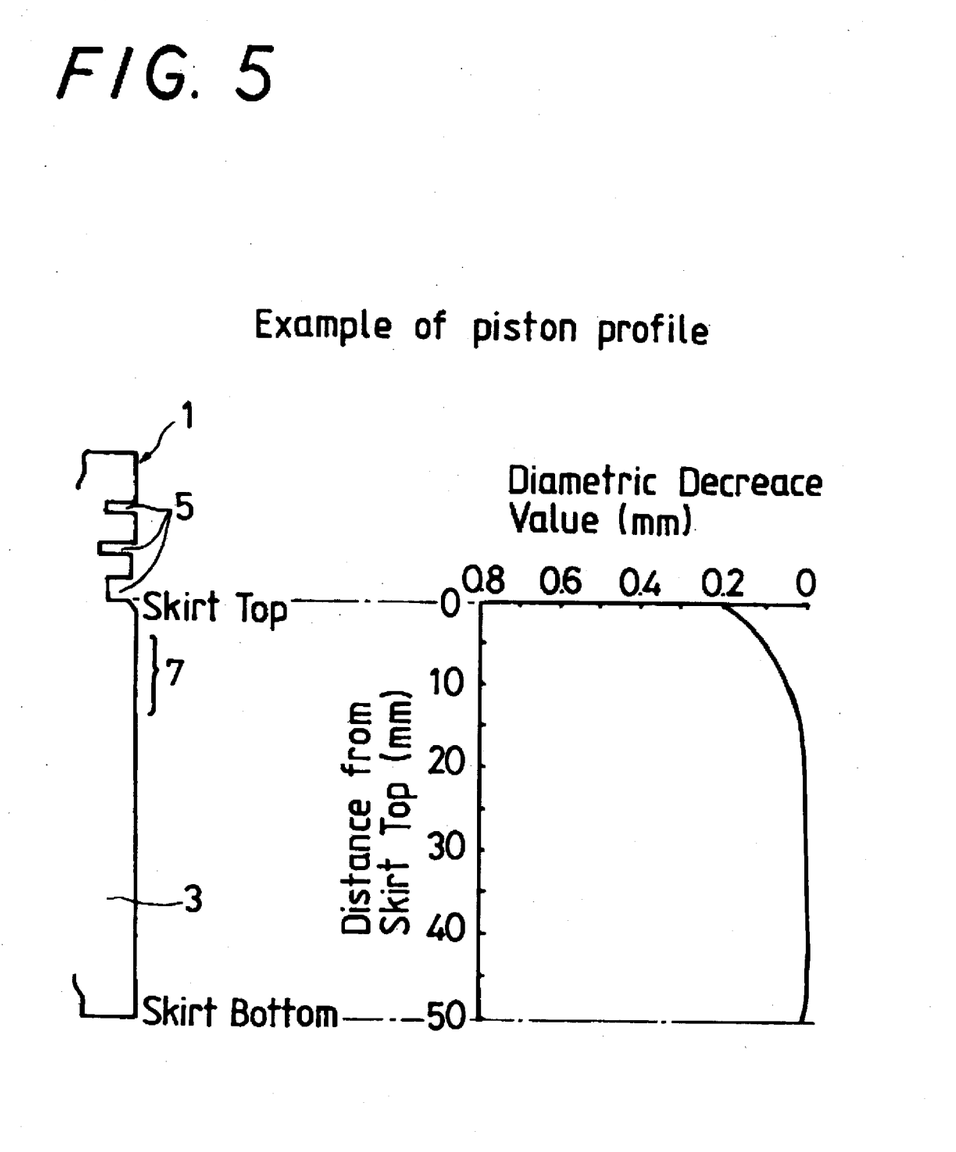
FIG. 5 is a schematic view showing a profile of the piston skirt.

The profile of the piston skirt has another important significance. The piston 1 used in internal combustion engines, as shown in FIG. 5, is formed in such a profile that the piston's external diameter progressively decreases in a shoulder portion 7 of the skirt 3, from under piston ring grooves (oil ring grooves) 5 toward a position near the height of the piston pin (not shown). Such an external profile of the piston is adopted to prevent the piston 1 from galling the cylinder liner wall as the piston is thermal expanded. In recent years, attempts have been made repetitively on a trial and error basis to determine an optimum profile of the piston for reducing slap noise by subtly changing the diametric decrease of the shoulder portion 7 of the piston skirt 3.

Figure 6:
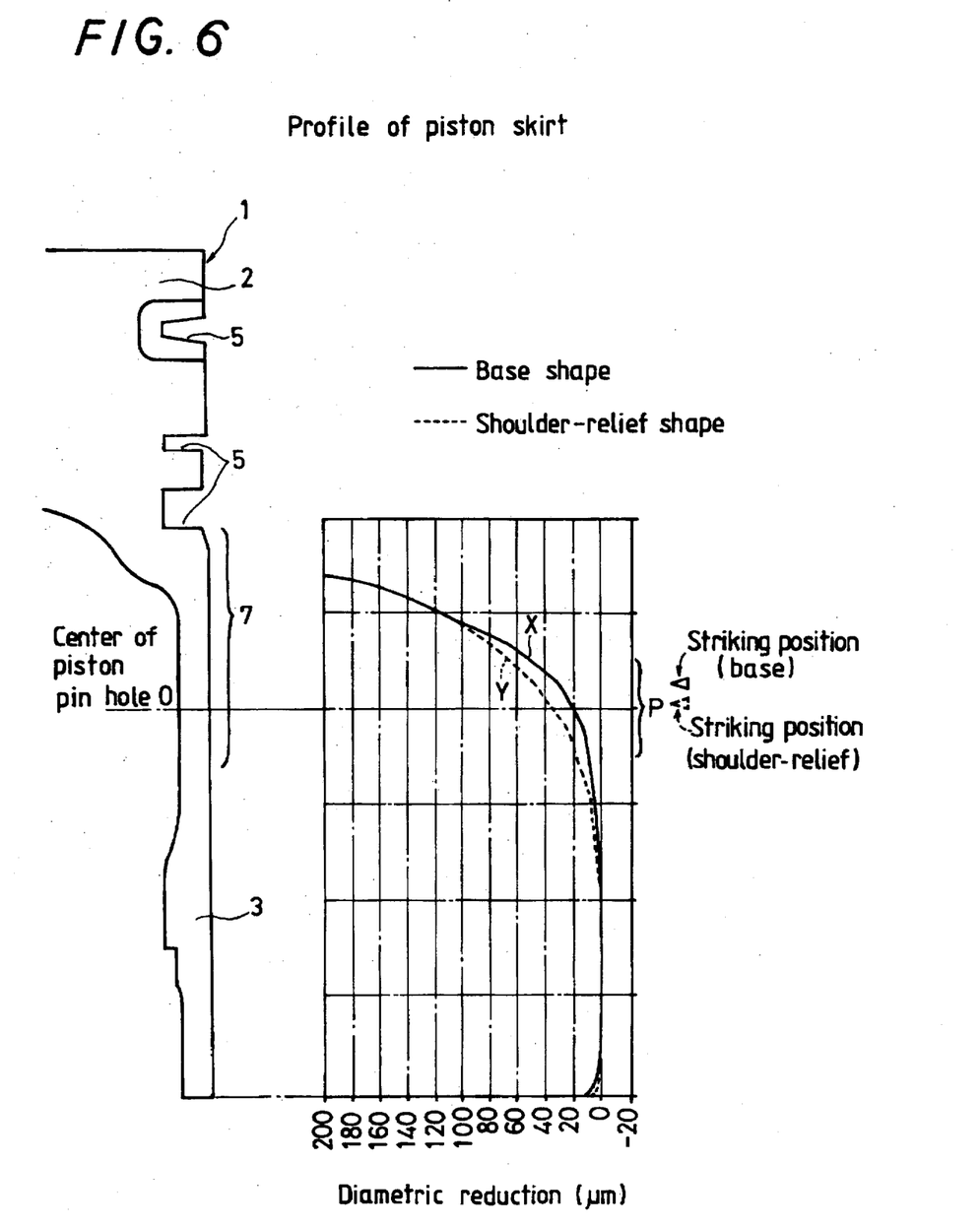
FIG. 6 is a schematic view showing a modified profile of the piston skirt.
Figure 7:
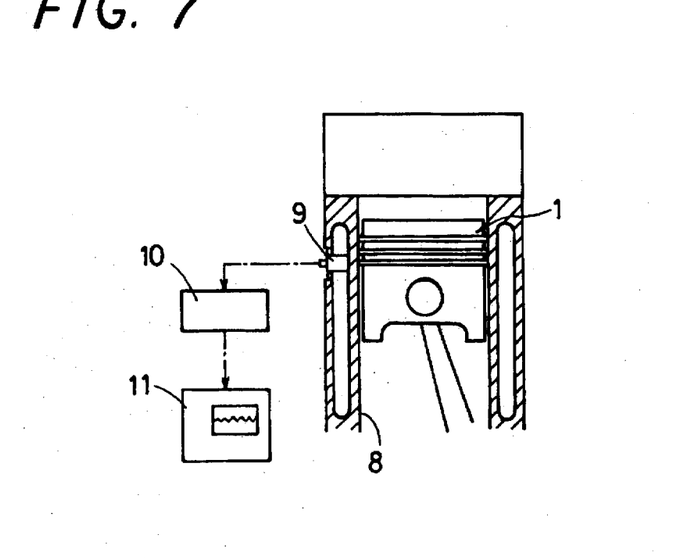
FIG. 7 is a schematic view showing a device for measuring vibrations of the cylinder liner wall.
Figure 8:
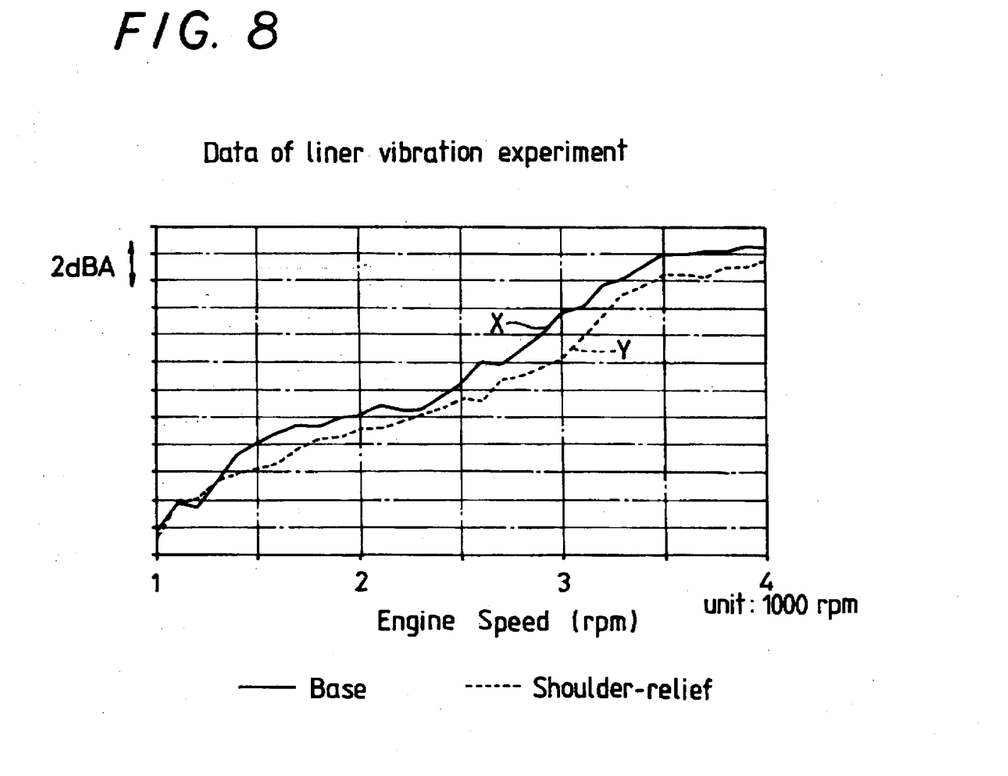
FIG. 8 is a graph showing the result of measurement of vibrations of the cylinder liner wall when the piston with the profile of FIG. 6 is used.

Take a piston with a profile as shown in FIG. 6 for example. We prepared two pistons 1 having symmetric left and right halves, one with a profile X represented by a solid line (hereinafter referred to as a "base profile") and one having the shoulder portion 7 of the piston skirt 3 modified to a profile Y represented by a dotted line (hereinafter referred to as a "shoulder-relief shape"). These two pistons 1 were subjected to tests where the vibrations of the cylinder liner wall 8 were measured using a device shown in FIG. 7. An acceleration sensor 9 was attached to the cylinder liner wall 8 of a 2500 cc direct injection type diesel engine to measure the vibrations of the cylinder liner wall 8 during the piston operation (1000-4000 r.p.m.) by using an oscilloscope 11 through a charge amplifier 10. The result of measurements is shown in FIG. 8. In FIG. 8, the solid line represents the vibrations when the piston 1 of the base shape X is assembled, and the dotted line indicates the vibrations when the piston 1 with a shoulder-relief shape Y is used.

Comparison between the pistons 1 with the base shape X and the shoulder-relief shape Y clearly shows that the vibrations for the shoulder-relief shape Y are significantly smaller, reducing piston slap. This experiment indicates that changing the amount of diametric reduction of the shoulder portion 7 of the skirt 3 is effective in reducing the slap.

To determine the optimum profile of the piston to minimize the slap by considering the balanced trade-off with durability characteristic requires conducting a large number of tests. Although no definite guideline has yet been established for giving an optimum profile, it is clear that the slap reduction cannot be achieved simply by decreasing the diametric reduction and that there is an optimum diametric reduction that will minimize the slap.

Figure 9:
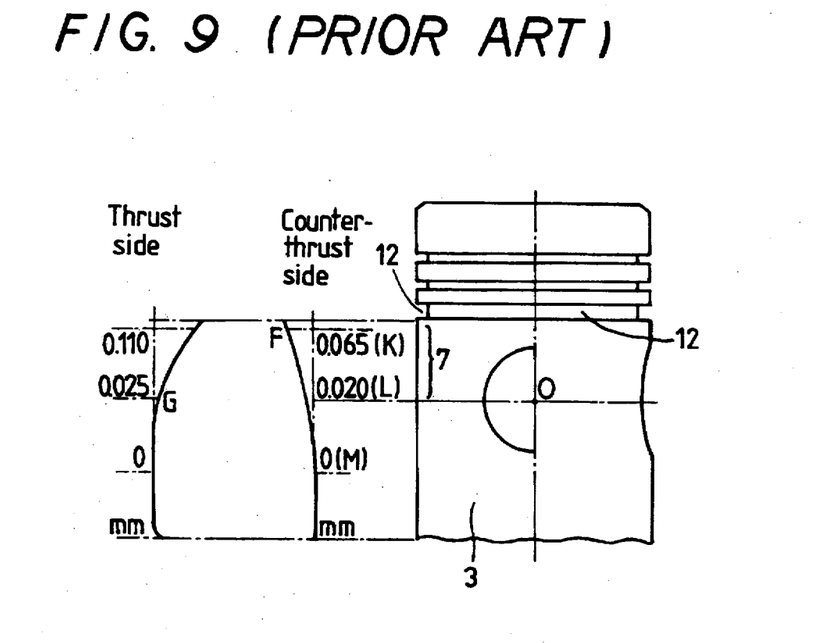
FIG. 9 is a schematic view showing a profile of the conventional piston skirt.

Let us consider the piston disclosed in the aforementioned Japan Patent Laid-Open No. 32150/1988. In FIG. 9, the piston has the diametric reductions on the thrust and counter-thrust sides differentiated from each other, as illustrated by the profiles F and G of the shoulder portion 7 of the skirt 3. That is, the piston is so formed that it has a large diameter reduction on the thrust side and a small diameter reduction on the counter-thrust side. Comparison of the profiles, as detailed by diameter reduction values, on the thrust and counter-thrust sides of the piston shown in FIG. 9 indicates that the difference in the diameter reduction between the profile F and the profile G gradually increases toward the top. The profile G resembles the commonly employed profile very much, whereas the profile F has much smaller diameter reductions compared with the commonly used profile. In the figure, reference K represents a position at the upper end of the shoulder portion, reference L a position at a piston pin center, and reference M a position at the end of the profile change.

Figure 10:
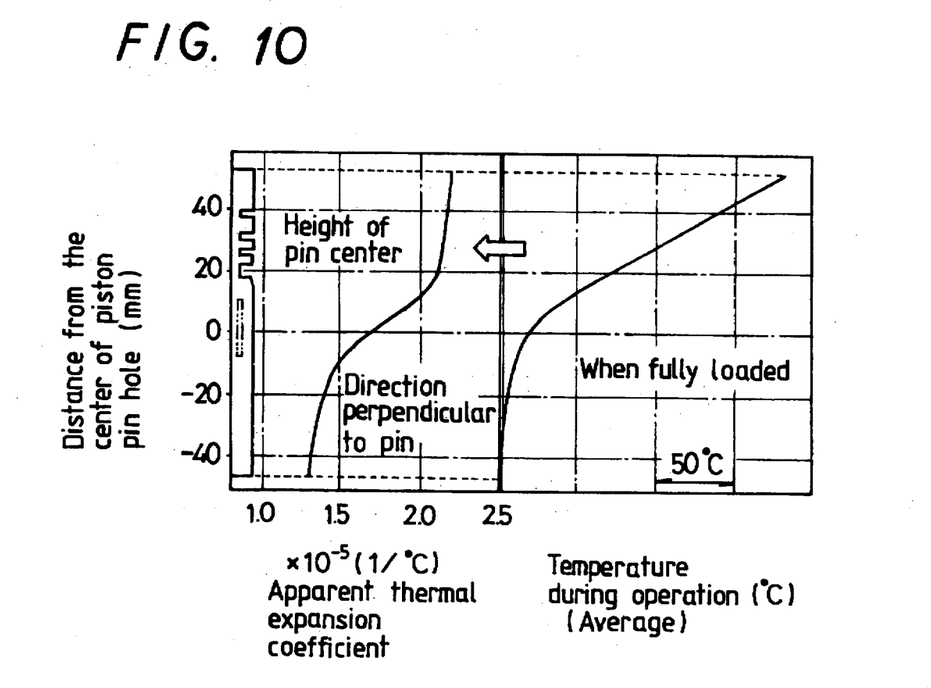
FIG. 10 is a schematic diagram showing the thermal expansion coefficient and temperature of the piston during operation.
Figure 11:
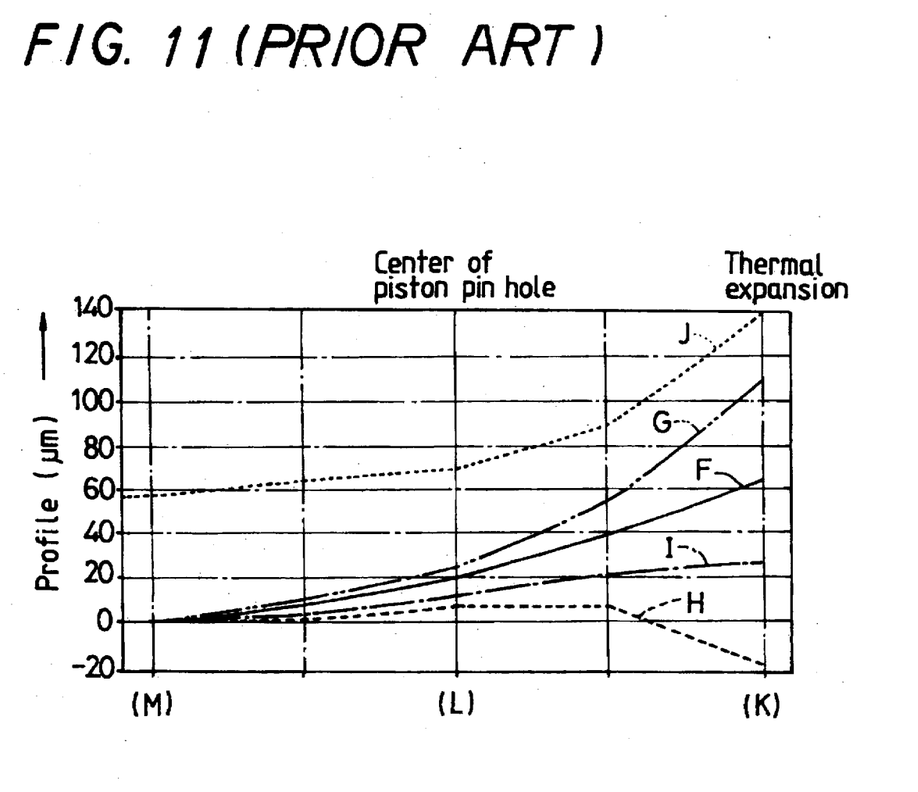
FIG. 11 is a graph showing the calculated difference between the profiles of the piston skirt of FIG. 9 before and after the piston is thermally expanded.

Because the profile F on the counter-thrust side of the piston has significantly small diameter reductions, there is a possibility that a portion under the oil ring 12 (position K in FIG. 9) may become excessively large by thermal expansion, resulting in galling and seizure. Calculation was conducted to see how the piston of FIG. 9 will deform when subjected to thermal expansion. The result of this calculation is shown in FIG. 11. The temperature and thermal expansion coefficient shown in FIG. 10 were used. The location represented by reference K at the upper end of the shoulder portion in FIG. 9 has the temperature of 150° C., thermal expansion coefficient of $2.0 \times 10^{-5}$ and bore diameter of 110 mm. Based on these values, the thermal expansion is calculated as follows:

$$(150-20) \times 2.0 \times 10^{-5} \times 110/2 = 143 \text{ (}\mu\text{m)}$$

The portion K is therefore expected to expand by 143 μm. Adding this thermal expansion to the profile F results in a profile H of the piston when thermally expanded, with the lower end of the skirt 3 taken as a reference. The profile H indicated by a dashed line in FIG. 11 reads −18 μm at the position K of FIG. 9, which means seizure is assumed to occur at position K.

SUMMARY OF THE INVENTION

The object of this invention is to provide a piston, which is asymmetric in the profile of the piston skirt between the left side and the right side and which has the diametric reductions in the shoulder portion of the skirt differentiated between the thrust side and the counter-thrust side to reduce the slap, prevent seizure due to thermal expansion and minimize noise caused by the slap.

This invention relates to a piston, which comprises: a crown having piston ring grooves; and a skirt integrally formed with the crown and having bosses formed with a piston pin hole; wherein a diametric reduction of a shoulder portion of the skirt on a thrust side is set larger than a diametric reduction of the same on an counter-thrust side, and the difference in the diametric reduction between the thrust side and the counter-thrust side becomes maximum at around a position corresponding in height to the center of the piston pin hole.

In this piston, the shoulder portion of the skirt on the counter-thrust side and on the thrust side is areas that are located perpendicular to the piston pin hole. Further, the shoulder portion of the skirt on the counter-thrust side and on the thrust side is areas that are located below the piston ring grooves.

Because the piston of this invention is constructed as described above, the point on the shoulder portion that strikes the cylinder liner on the thrust side is near a position corresponding in height to the center of the piston pin hole. On the counter-thrust side, the impact point is higher. Further, the piston has a shoulder-relief shape in its profile on the thrust side, whereas on the counter-thrust side the shoulder portion remains without relief.

During the compression stroke, the piston moves up pressed against the cylinder liner wall. Next, near the top dead center of the compression stroke, the piston is rapidly pivoted toward the thrust side and hits the cylinder liner wall. Because the shoulder portion of the skirt on the counter-thrust side remains without relief, the inclination angle of the piston when it is moving up is small. When the inclination angle is large, the pivoting angle of the piston also becomes large, increasing the impact force of the piston against the cylinder liner wall to the corresponding extent. With the piston of this invention, however, because the piston inclination angle during the upward motion is small, the striking force is correspondingly small.

Near the top dead center, the piston pivots about the piston pin and strikes the cylinder liner wall on the thrust side. If the piston inclination angle is the same, the greater the distance is from the center of the piston pin to the piston's impact portion against the cylinder liner wall, the larger the impact force will be. This piston, however, has its shoulder portion relief enough on the thrust side that the impact portion can be brought close to a position equal in height to the center of the piston pin, i.e., it can be lowered, which in turn reduces the impact force. This piston therefore can reduce the piston slap and noise.

As described above, because this piston is so profiled that a diametric reduction of the shoulder portion of the skirt is greater on thrust side than on the counter-thrust side and that the difference in diametric reduction between the thrust side and counter-thrust side is maximum at around a position corresponding in height to the center of the piston pin hole, the angle which is generated by pivoting of piston from the counter-thrust side toward the thrust side becomes small. At the same time, the impact point of the shoulder portion striking the cylinder liner wall can be brought close to the position equal in height to the center of the piston pin. Hence, the impact force of the piston as it pivots from the counter-thrust side to the thrust side is reduced, lowering the slap.

Further, the fact that this piston can reduce the slap sound simply by changing the profile of the shoulder portion of the skirt offers many advantages, such as minimal increases in weight and production cost and reduction of slap with low cost, over the conventional pistons, in which, to reduce slap an outer ring member is fitted over the skirt of the piston body so that it can be moved relative to the skirt in the direction of thrust, with a shock absorber member of rubber or synthetic resin disposed in a gap between the skirt and the outer ring member or hydraulic pressure supplied to the gap. Applying this invention to the pistons with the above-mentioned outer ring member will further reduce the slap.

Furthermore, because this piston is so profiled that the difference in the diametric reduction between the thrust side and the counter-thrust side is maximum at around a position equal in height to the piston pin hole, the shoulder portion of the skirt, even when thermally expanded, can be prevented from galling the cylinder liner wall, eliminating the problem of seizure.

DETAILED DESCRIPTION OF THE PREFERRED EMBODIMENTS

Figure 1:
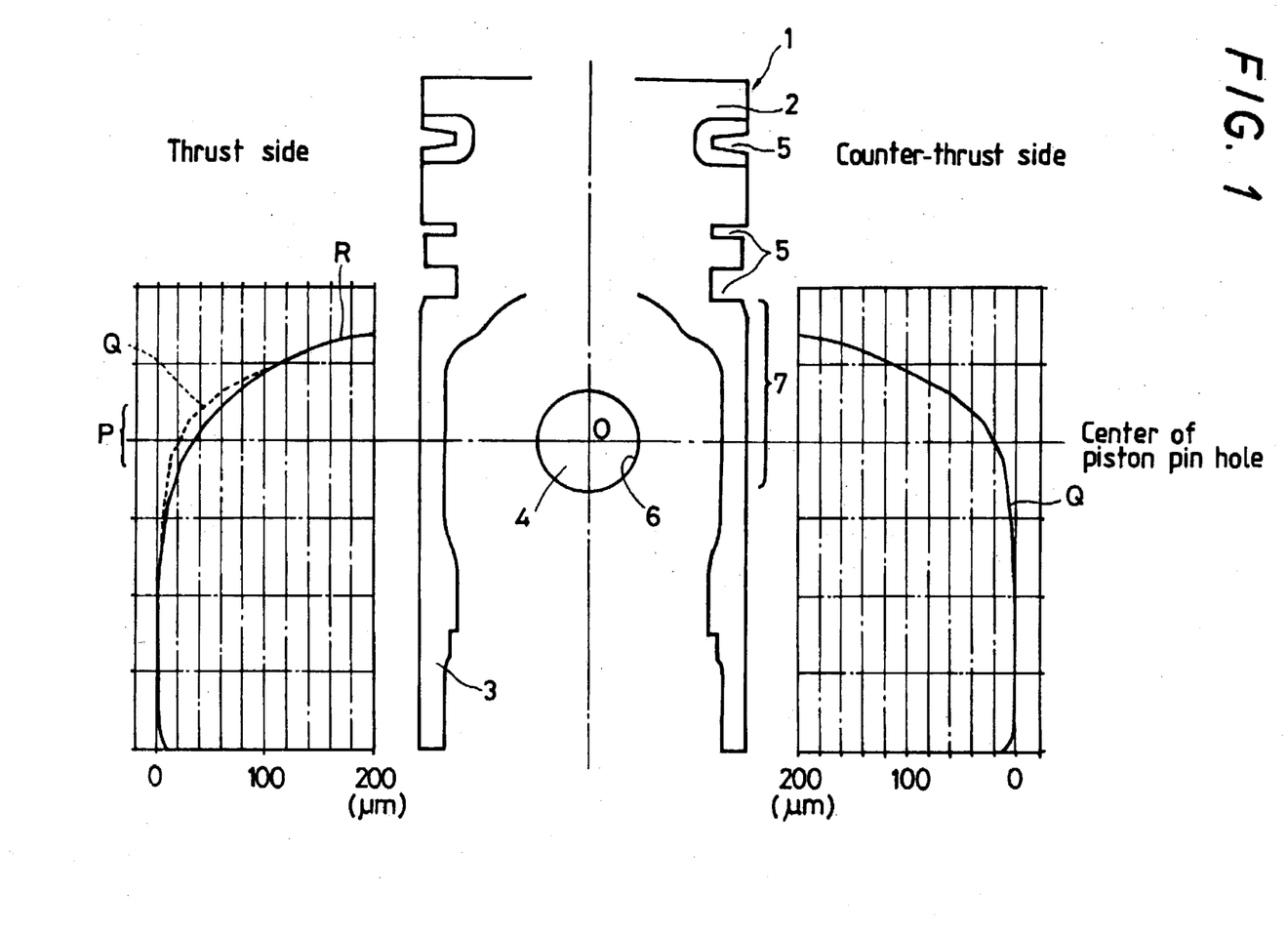
FIG. 1 is a schematic diagram showing a piston as one embodiment of this invention.

Now, one embodiment of the piston according to this invention will be described by referring to the accompanying drawings. As shown in FIG. 1, the piston 1 has a piston body which has formed in one piece a crown 2 as a piston head and a skirt 3 having a boss (not shown), and a piston pin 4 that rotatably connects the piston body and a connecting rod (not shown). The crown 2 of the piston body is formed with piston ring grooves 5, in each of which a piston ring (not shown) is fitted. The skirt 3 located under the crown 2 is formed integral with it. The skirt 3 of the piston body has a boss which is formed with a piston pin hole 6 through which to insert the piston pin 4.

In FIG. 1, the profiles of the skirt 3 on the left and right side of the piston 1 are shown. A profile Q on the counter-thrust side is shown enlarged to the right of the piston 1 and represented by a solid line, and a profile R on the thrust side is shown enlarged to the left of the piston 1 and represented by a solid line. The piston 1 is profiled so that the outer diameter of the piston progressively decreases in the shoulder portion 7 of the skirt 3, beginning in a position under the oil ring grooves 5 and ending in a position nearly equal in height to the piston pin 4. A dashed curve shown at the left of FIG. 1 represents the profile when the piston 1 is symmetric between the left and right halves. The piston 1 is so shaped that the diameter reduction in the shoulder portion 7 of the skirt 3 is greater on the thrust side than on the counter-thrust side. Further, the difference in the diameter reduction between the thrust side and the counter-thrust side is maximum at around a position P equal in height to the center O of the piston pin 4.

The piston 1 has a relieved shoulder portion 7, i.e., a profile R with a large diametric reduction on the thrust side, whereas on the counter-thrust side it has a shoulder portion 7 without relief, i.e., a profile Q with a small diametric reduction. These profiles are the same as those shown in FIG. 6. In FIG. 6, when the piston is formed in a shoulder-relief shape with a large diametric reduction at around the height of the center O of the piston pin, as indicated by a triangle mark Δ (the solid-line triangle represents the base shape and the dotted-line triangle represents the shoulder-relief shape), the impact portion at which the shoulder portion 7 of the skirt 3 strikes the cylinder liner wall 8 is lowered (refer to the dotted triangle). With the piston 1 of this invention, too, the diametric reduction at around the position P equal in height to the center of the piston pin 4 is made larger on the thrust side than on the counter-thrust side, so that the impact portion where the shoulder portion 7 of the skirt 3 strikes the cylinder liner wall 8 is lower on the thrust side than on the anti-thrust side.

Figure 2:
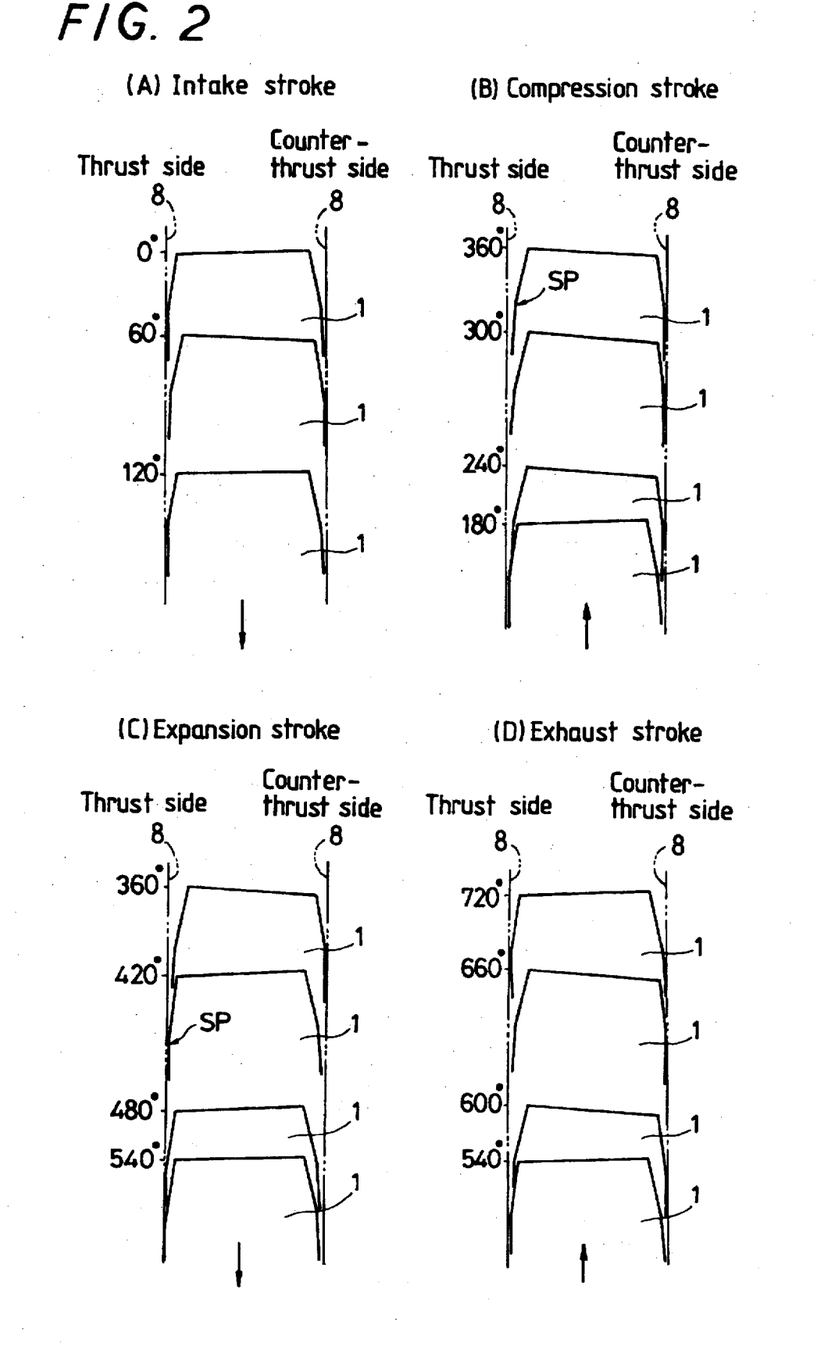
FIG. 2 is an explanatory diagram showing the piston in motion every 60° of crank angle.

Next, by referring to FIG. 2, let us explain about the mechanism of how the slap of the piston 1 is reduced. FIG. 2 illustrates the operation of the piston in a simplified form. In the figure, the left side of the piston 1 represents the thrust side and the right side of the piston the counter-thrust side. Considering the thermal expansion, the piston 1 is generally profiled so that the upper part of the piston has a smaller diameter, as shown in FIG. 5. As shown in FIG. 2, the piston 1 repeats an oscillatory motion in each of the intake stroke (A), compression stroke (B), expansion stroke (C) and exhaust stroke (D). In the compression stroke, the piston 1 moves up with a portion indicated by an arrow SP on the thrust side parted from the cylinder liner wall 8, i.e., it moves up pressed against the cylinder liner wall 8 on the counter-thrust side. In the expansion stroke (explosion stroke), at around the top dead center the piston 1 is rapidly moved toward the thrust side by the pressure in the cylinder. At this moment, the portion of the piston 1 indicated by the arrow SP strikes the cylinder liner wall 8.

Because the piston 1 of this invention has the profile Q on the counter-thrust side in which the shoulder portion 7 of the skirt 3 is not so relieved, the inclination angle of the piston 1 as it moves up the cylinder is small. The counter-thrust side of the piston 1 has the profile Q of the shoulder portion 7 with a small diametric reduction, in order to make the inclination angle of the piston small, i.e., to make the impact portion of the piston 1 against the cylinder liner wall 8 as high as possible. When the inclination angle is large, the pivotal angle of the piston 1 becomes also large increasing the distance that the thrust side must travel before striking the cylinder liner wall 8. This increases the striking force against the cylinder liner wall 8 to the corresponding extent. With the piston 1 of this invention, however, the inclination angle of the piston 1 during the upward movement is small, so that the impact force is correspondingly small.

On the thrust side of the piston 1, the piston strikes the cylinder liner wall 8 at near the top dead center. Because this impact occurs when the piston 1 pivots about the piston pin, the impact force increases as the distance from the center O of the piston pin to the piston's impact point on the cylinder liner wall 8 becomes large. With this invention, however, because the piston 1 on the thrust side has the shoulder portion 7 relieved, the impact point can be lowered to around the position P equal in height to the center O of the piston pin hole, reducing the impact force and therefore the slap.

Figure 3:
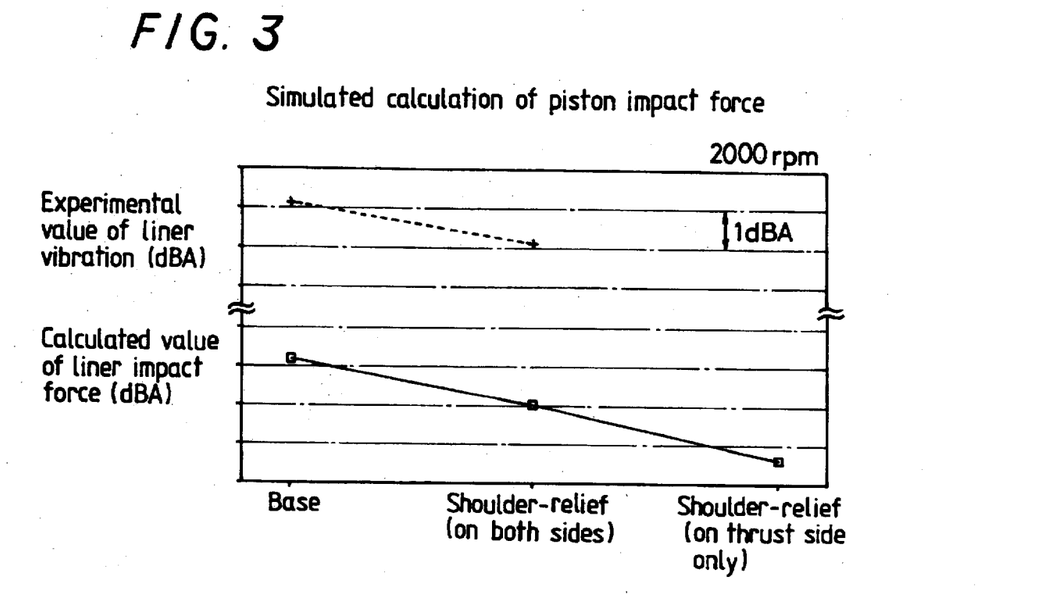
FIG. 3 is a graph showing the result of simulation of impact forces with which the piston of FIG. 1 strikes the cylinder liner wall.

Next, by referring to FIG. 3, the result of simulation of an impact force of the piston 1 applied to the cylinder liner wall 8 (represented by L) is described. In FIG. 3, the "base" represents the result of calculation for a piston with symmetrical left and right halves and with the base shape of FIG. 6; the "shoulder-relief (on both sides)" represents the result of calculation for a piston with symmetrical left and right halves and with the shoulder-relief shape of FIG. 6; and the "shoulder-relief (on thrust side only)" represents the result of calculation for an example piston of this invention, which has the counter-thrust side formed in the base shape and the thrust side formed in the shoulder-relief shape. It is noted that "+" mark represents the result of experiments that used the pistons with the "base", and "shoulder-relief (on both sides)" shapes and which exhibits good agreement with this simulation. This data is shown to demonstrate the reliability of this simulation. FIG. 3 shows that the piston 1 of this invention with the "shoulder-relief (on thrust side only)" shape is capable of reducing the impact force by more than 1 dBA when compared with the conventional piston having symmetric left and right halves with the "shoulder-relief (on both sides)", shape. The piston 1 of this invention therefore can reduce the slap significantly.

Figure 4:
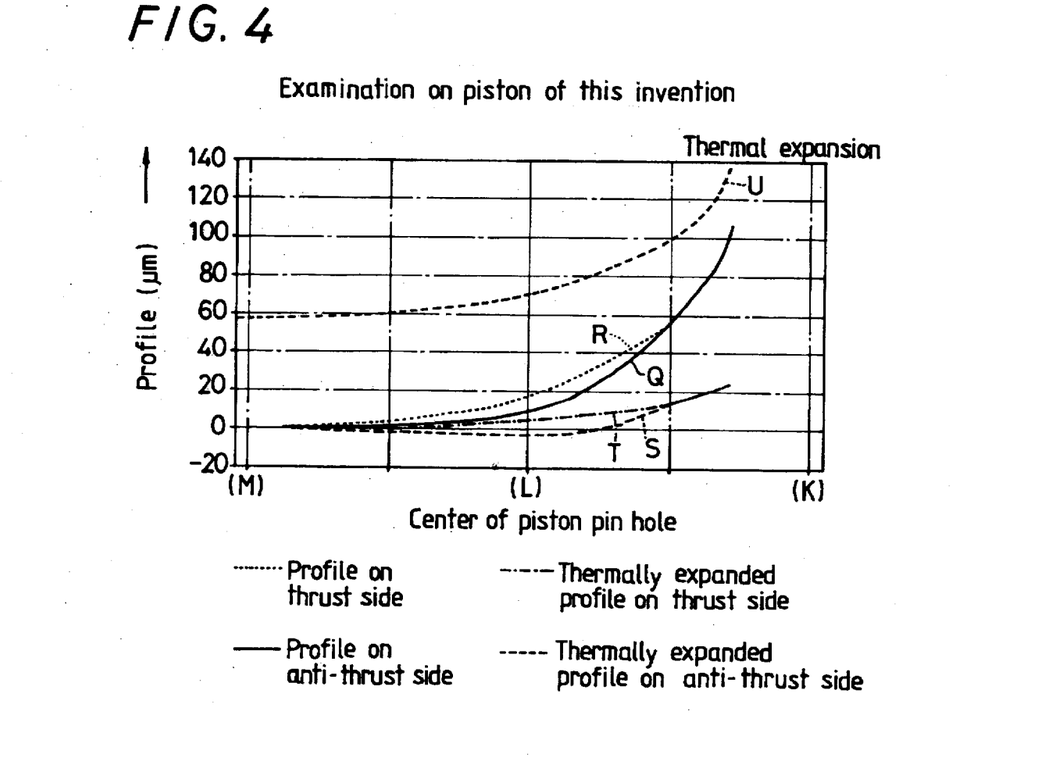
FIG. 4 is a graph showing the calculated difference between the profiles of the piston skirt before and after the piston is thermally expanded.

Next, the influences of the thermal expansion of the piston will be discussed with reference to FIG. 4. A solid line represents a profile Q on the counter-thrust side of a piston of this invention and a dotted line represents a profile R on the thrust side of the same. Calculating the thermal expansion of this piston in the same way as in FIG. 11 results in a curve of short-dashed line U. The thermally expanded profiles T and S with the lower end of the skirt 3 taken as reference are as shown in FIG. 4 (a long-dashed line and a one-dot chain line represent a profile S on the counter-thrust side and a profile T on the thrust side, respectively, when the piston is thermally expanded).

Comparison with the piston of Japan Patent Laid-Open No. 32150/1988 shown in FIG. 9 shows that the piston 1 of this invention is provided beforehand with a large diametric reduction at a portion below the piston ring grooves 5 to avoid contact of this portion with the cylinder liner wall 8, so that there is no need to make the thrust side and the counter-thrust side asymmetric.

Hence, this piston 1 is so constructed that the difference in the diametric reduction between the thrust side and the counter-thrust side becomes maximum at around a position P equal in height to the piston pin 4 and that the piston is asymmetric only at around the height P. With this construction, even when the shoulder portion 7 of the skirt B is expanded by heat, the point on the piston that strikes the cylinder liner wall 8 hardly changes with the result that the shoulder portion 7 of the skirt 3 does not gall the cylinder liner wall 8 as does the piston shown in FIG. 9 and therefore can avoid the problem of seizure.

The piston 1 described in the above embodiment is an ordinary type piston which does not have any special member on the surface of the piston body to reduce slap but which has changed the profile of the piston skirt and thereby solved the problem of slap and seizure. This invention can also be applied to a piston which has an outer ring member (not shown) fitted over the skirt 3 of the piston body so that the ring member is supported movable relative to the skirt 3 in the direction of thrust, with a shock absorber member (not shown) of rubber or synthetic resin disposed in a clearance between the skirt 3 and the outer ring member or hydraulic pressure supplied to the clearance to reduce the slap. This arrangement achieves a remarkable reduction in the slap.

In summary, the piston thus has a central longitudinal axis perpendicular to the piston ring grooves, a pin hole axis defined by the connecting pin hole, and skirts on the thrust side and the counter-thrust side; a thrust surface profile along a plane coincident with the longitudinal axis and perpendicular to the pin hole axis; a counter-thrust surface profile along the same plane; and a difference between the thrust surface profile and the counter-thrust surface profile which is maximum adjacent an intersection of the pin hole axis with the longitudinal axis, i.e. in a region along the longitudinal axis that is at that level along the axis. More particularly, the piston of the present invention includes a difference in the perpendicular distances from a point of the longitudinal axis to the thrust surface profile and to the counter-thrust surface profile.

What is claimed is:

1. A piston comprising:
   a crown having piston ring grooves; and
   a skirt integrally formed with the crown and having bosses formed with a piston pin hole;
   wherein a diametric reduction of a shoulder portion of the skirt on a thrust side is set larger than a diametric reduction of the same on an counter-thrust side, and the difference in the diametric reduction between the thrust side and the counter-thrust side becomes maximum at around a position corresponding to the center of the piston pin hole.

2. A piston according to claim 1, wherein the shoulder portion of the skirt on the counter-thrust side and on the thrust side is areas that are located perpendicular to the piston pin hole.

3. A piston according to claim 1, wherein the shoulder portion of the skirt on the counter-thrust side and on the thrust side is areas that are located below the piston ring grooves.

4. A piston comprising:
   at least one piston ring groove and a central longitudinal axis perpendicular to the piston ring groove;
   a connecting pin hole and a pin hole axis defined by the connecting pin hole;
   a thrust side skirt; and
   a counter-thrust side skirt; wherein
   the thrust side skirt includes a thrust surface profile along a plane coincident with the longitudinal axis and perpendicular to the pin hole axis; and wherein
   the counter-thrust side skirt includes a counter-thrust surface profile along the plane coincident with the longitudinal axis and perpendicular to the pin hole axis; and wherein
   an asymmetric difference between the thrust surface profile and the counter-thrust surface profile is maximum adjacent an intersection of the pin hole axis with the longitudinal axis.

5. The piston according to claim 4, wherein the difference between the thrust surface profile and the counter-thrust surface profile comprises
   perpendicular respective distances from a point of the longitudinal axis to the thrust surface profile and to the counter-thrust surface profile being unequal.

* * * * *